(12) United States Patent
Sunahara et al.

(10) Patent No.: US 9,889,846 B2
(45) Date of Patent: Feb. 13, 2018

(54) VEHICLE BEHAVIOR CONTROL DEVICE

(71) Applicant: MAZDA MOTOR CORPORATION, Hiroshima (JP)

(72) Inventors: Osamu Sunahara, Hiroshima (JP); Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/341,710

(22) Filed: Nov. 2, 2016

(65) Prior Publication Data

US 2017/0129480 A1 May 11, 2017

(30) Foreign Application Priority Data

Nov. 6, 2015 (JP) ................................ 2015-218638

(51) Int. Cl.
| | | |
|---|---|---|
| *B62D 12/00* | (2006.01) | |
| *B60W 30/045* | (2012.01) | |
| *B62D 6/00* | (2006.01) | |

(52) U.S. Cl.
CPC .......... *B60W 30/045* (2013.01); *B62D 6/003* (2013.01); *B60W 2510/207* (2013.01); *B60W 2520/10* (2013.01); *B60W 2540/10* (2013.01)

(58) Field of Classification Search
CPC .............................. B60W 30/045; B62D 6/003
USPC .......................................................... 701/41
See application file for complete search history.

(56) References Cited

U.S. PATENT DOCUMENTS

| | | | |
|---|---|---|---|
| 5,285,390 A | * | 2/1994 | Haseda ................... B62D 7/159 180/422 |
| 8,433,493 B2 | | 4/2013 | Takahashi et al. |
| 8,538,653 B2 | | 9/2013 | Miyajima et al. |
| 8,676,464 B2 | | 3/2014 | Shimura et al. |
| 8,880,293 B2 | | 11/2014 | Hirao et al. |
| 8,977,464 B1 | | 3/2015 | Takahashi et al. |
| 8,989,981 B2 | | 3/2015 | Yamakado et al. |
| 9,043,116 B2 | | 5/2015 | Takahashi et al. |
| 9,086,427 B2 | | 7/2015 | Maeda et al. |
| 9,139,107 B2 | | 9/2015 | Kageyama et al. |
| 9,211,875 B2 | | 12/2015 | Harada |
| 9,296,374 B2 | | 3/2016 | Yamakado et al. |

(Continued)

FOREIGN PATENT DOCUMENTS

| | | |
|---|---|---|
| EP | 2 712 780 A1 | 4/2014 |
| EP | 2 712 782 A1 | 4/2014 |

(Continued)

OTHER PUBLICATIONS

JP Office Action dated Jul. 31, 2017, from corresponding JP Appl No. 2015-218638, 4 pp.

*Primary Examiner* — Muhammad Shafi
(74) *Attorney, Agent, or Firm* — Studebaker & Brackett PC

(57) ABSTRACT

The vehicle behavior control device is designed to control a behavior of a vehicle having steerable front road wheels. The vehicle behavior control device comprises a PCM configured to perform control to reduce a torque for the vehicle according to a steering speed of the vehicle, and acquire an understeer-causing state of the vehicle which is a factor causing understeer, wherein the PCM is further configured to perform control to, after reducing the torque, increase the torque at a change rate decided based on the understeer-causing state of the vehicle acquired by the PCM.

5 Claims, 7 Drawing Sheets

(56) References Cited

U.S. PATENT DOCUMENTS

| | | |
|---|---|---|
| 9,352,747 B2 | 5/2016 | Nagatsuka et al. |
| 2005/0257988 A1* | 11/2005 | Ohta .................. B62D 5/008 180/421 |
| 2011/0202250 A1 | 8/2011 | Miyajima et al. |
| 2012/0053791 A1 | 3/2012 | Harada |
| 2012/0209489 A1 | 8/2012 | Saito et al. |
| 2012/0277965 A1 | 11/2012 | Takahashi et al. |
| 2012/0316744 A1 | 12/2012 | Shimura et al. |
| 2013/0041541 A1 | 2/2013 | Kageyama et al. |
| 2013/0079988 A1 | 3/2013 | Hirao et al. |
| 2013/0345901 A1 | 12/2013 | Maeda et al. |
| 2014/0222309 A1 | 8/2014 | Yamakado et al. |
| 2015/0094924 A1 | 4/2015 | Takahashi et al. |
| 2015/0094927 A1 | 4/2015 | Takahashi et al. |
| 2015/0120121 A1 | 4/2015 | Nobumoto et al. |
| 2015/0166025 A1 | 6/2015 | Nagatsuka et al. |
| 2015/0239442 A1 | 8/2015 | Yamakado et al. |
| 2015/0298696 A1 | 10/2015 | Nagatsuka et al. |
| 2015/0321669 A1 | 11/2015 | Inou et al. |
| 2015/0367852 A1 | 12/2015 | Nagatsuka et al. |
| 2016/0059852 A1 | 3/2016 | Yamakado et al. |
| 2016/0244038 A1 | 8/2016 | Yamakado et al. |

FOREIGN PATENT DOCUMENTS

| | | |
|---|---|---|
| JP | 2011-088576 A | 5/2011 |
| JP | 2014-166014 A | 9/2014 |
| JP | 2015-085819 A | 5/2015 |
| JP | 2015-085820 A | 5/2015 |
| JP | 2015-085823 A | 5/2015 |
| JP | 2015-089251 A | 5/2015 |
| JP | 2015-089252 A | 5/2015 |
| JP | 2015-182752 A | 10/2015 |
| JP | 2016-039750 A | 3/2016 |
| JP | 2016-039751 A | 3/2016 |
| WO | 2012/042935 A1 | 4/2012 |
| WO | 2014/054432 A1 | 4/2014 |
| WO | 2014/119171 A1 | 8/2014 |
| WO | 2016/020718 A1 | 2/2016 |

* cited by examiner

VEHICLE BEHAVIOR CONTROL DEVICE

TECHNICAL FIELD

The present invention relates to a vehicle behavior control device, and more particularly to a vehicle behavior control device for controlling a behavior of a vehicle having steerable front road wheels.

BACKGROUND ART

Heretofore, there has been known a control system capable of, in a situation where a behavior of a vehicle becomes unstable due to road wheel slip or the like, controlling the vehicle behavior to enable a safe traveling (e.g., an antiskid brake system). Specifically, there has been known a control system operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to adjust a degree of deceleration during vehicle cornering to thereby adjust a load to be applied to front road wheels so as to allow a series of driver's operations (braking, turning of a steering wheel, accelerating, turning-back of the steering wheel, etc.) during vehicle cornering under a normal traveling condition to be realized naturally and stably, differently from the aforementioned control for improving safety in a traveling condition causing the vehicle behavior to become unstable (see, for example, the following Patent Document 1).

Further, there has been proposed a vehicle behavior control device operable to reduce a driving force for a vehicle according to a yaw rate-related quantity corresponding to a steering wheel operation of a driver (e.g., yaw acceleration), thereby making it possible to quickly generate a vehicle deceleration in response to start of the steering wheel operation by the driver and thus quickly apply a sufficient load to front road wheels as steerable road wheels (see, for example, the following Patent Document 2). In this vehicle behavior control device, in response to start of the steering wheel operation, a load is quickly applied to the front road wheels to cause an increase in frictional force between each of the front road wheels and a road surface and thus an increase in cornering force of the front road wheels, thereby providing an improved turn-in ability of the vehicle in an initial phase after entering a curve, and an improved responsiveness to a turning operation of a steering wheel. This makes it possible to realize a vehicle behavior as intended by the driver.

CITATION LIST

Patent Document

Patent Document 1: JP 2011-88576A
Patent Document 2: JP 2014-166014A

SUMMARY OF INVENTION

Technical Problem

Meanwhile, it is known that, in a state in which a gross weight of a vehicle is increased according to the number of occupants or the amount of loaded luggage, or in a state in which aging degradation of a tire of a vehicle causes a decrease in grip force of the tire, an understeer tendency of the vehicle becomes strong.

In this regard, although the conventional vehicle behavior control device as described in the Patent Document 2 is configured to perform control of, after reducing a driving force for a vehicle according to a yaw rate-related quantity corresponding to according to a steering wheel operation of a driver, reducing a driving force reduction amount (i.e., increasing the driving force) when an absolute value of a steering wheel angle of the vehicle is decreasing, the states of the gross vehicle weight and the tire aging degradation are not taken into account at all when performing the control to increase the driving force.

Thus, assume that the conventional vehicle behavior control device operates to perform the control of, after reducing a driving force for a vehicle, increasing the driving force, under a condition that an understeer tendency of the vehicle becomes strong due to an increase in gross vehicle weight, or tire aging degradation. In this case, as the load applied to the front road wheels is gradually reduced along with the increase in the driving force and thus the cornering force of the front road wheels is gradually reduced, understeer becomes more likely to occur, as compared to a state before the occurrence of the increase in gross vehicle weight or the tire aging degradation.

The present invention has been made to solve the above conventional problem, and an object thereof is to provide a vehicle behavior control device capable of performing a vehicle behavior control so as to accurately realize a behavior of a vehicle as intended by a driver, even under a condition that an understeer tendency of the vehicle becomes strong.

Solution to Technical Problem

In order to achieve the above object, the present invention provides a vehicle behavior control device for controlling a behavior of a vehicle having steerable front road wheels. The vehicle behavior control device comprises: driving force control part configured to perform control to reduce a driving force for the vehicle according to a yaw rate-related quantity which is related to a yaw rate of the vehicle; and understeer-causing factor acquisition part configured to acquire an understeer-causing state of the vehicle which is a factor causing understeer, wherein the driving force control part is further configured to perform control to, after reducing the driving force, increase the driving force at a change rate decided based on the understeer-causing state of the vehicle acquired by the understeer-causing factor acquisition part.

In the vehicle behavior control device of the present invention having the above feature, the driving force control part is operable to reduce a driving force for the vehicle according to the yaw rate-related quantity, and then increase the driving force at a change rate decided based on the understeer-causing state of the vehicle acquired by the understeer-causing factor acquisition part, so that, when the driving force is increased to reduce a load applied to the front road wheels and thus reduce a cornering force of the front road wheels, the cornering force of the front road wheels can be reduced at a change rate according to the understeer-causing state of the vehicle. Thus, under the condition that an understeer tendency of the vehicle becomes strong due to an increase in gross vehicle weight, or tire aging degradation, it becomes possible to reduce the cornering force of the front road wheels at a change rate according to the increase in gross vehicle weight or the tire aging degradation to thereby suppress the occurrence of understeer and thus perform a vehicle behavior control so as to accurately realize a vehicle behavior as intended by a driver, as well as before the occurrence of the increase in gross vehicle weight or the tire aging degradation.

Preferably, in the vehicle behavior control device of the present invention, the understeer factor acquisition part is operable to acquire a gross weight of the vehicle, as the understeer-causing state of the vehicle; and the driving force control part is operable to reduce a change rate during increasing of the driving force to a smaller value, as the gross weight of the vehicle acquired by the understeer factor acquisition part becomes larger.

According to this feature, the driving force control part is operable to reduce the change rate during the increasing of the driving force to a smaller value, as the gross weight of the vehicle acquired by the understeer factor acquisition part becomes larger, so that, when the driving force is increased to reduce a load applied to the front road wheels and thus reduce a cornering force of the front road wheels, a change rate during the reducing of the load applied to the front road wheels can be reduced to a smaller value as the gross vehicle weight becomes larger, to thereby allow the cornering force of the front road wheels to be moderately reduced. Thus, under the condition that an understeer tendency of the vehicle becomes strong due to an increase in gross vehicle weight, it becomes possible to moderately reduce the cornering force of the front road wheels according to increase in the gross vehicle weight to thereby suppress the occurrence of understeer and thus perform a vehicle behavior control so as to accurately realize a vehicle behavior as intended by a driver, as well as before the occurrence of the increase in gross vehicle weight.

Preferably, in the vehicle behavior control device of the present invention, the understeer factor acquisition part is operable to acquire an elapsed period of time after installation of tires in the vehicle, as the understeer-causing state of the vehicle, and the driving force control part is operable to reduce a change rate during increasing of the driving force to a smaller value, as the elapsed period of time after installation of tires in the vehicle, acquired by the understeer factor acquisition part becomes larger.

According to this feature, the driving force control part is operable to reduce the change rate during the increasing of the driving force to a smaller value, as the elapsed period of time after the tire installation acquired by the understeer factor acquisition part becomes larger, so that, when the driving force is increased to reduce a load applied to the front road wheels and thus reduce a cornering force of the front road wheels, a change rate during the reducing of the load applied to the front road wheels can be reduced to a smaller value as the elapsed period of time after the tire installation becomes longer, to thereby allow the cornering force of the front road wheels to be moderately reduced. Thus, under the condition that an understeer tendency of the vehicle becomes strong due to tire aging degradation, it becomes possible to moderately reduce the cornering force of the front road wheels according to the tire aging degradation to thereby suppress the occurrence of understeer and thus perform a vehicle behavior control so as to accurately realize a vehicle behavior as intended by a driver, as well as before the occurrence of the tire aging degradation.

Preferably, in the vehicle behavior control device of the present invention, the driving force control part is operable, when the steering wheel angle of the vehicle is increasing and the yaw rate-related quantity is increasing, to reduce the driving force according to the yaw rate-related quantity being increasing, and, subsequently, when the steering wheel angle decreases or becomes constant, to increase the driving force.

According to this feature, when the driving force is increased in response to completion of a steering wheel turning operation, to reduce a load applied to the front road wheels and thus reduce a cornering force of the front road wheels, it becomes possible to reduce the cornering force of the front road wheels at a change rate according to the increase in gross vehicle weight, the tire aging degradation or the like, to thereby suppress the occurrence of understeer and thus perform a vehicle behavior control so as to accurately realize a vehicle behavior as intended by a driver in a period after the completion of the steering wheel turning operation, as well as before the occurrence of the increase in gross vehicle weight, the tire aging degradation or the like.

Effect of Invention

The vehicle behavior control device of the present invention can perform a vehicle behavior control so as to accurately realize a behavior of a vehicle as intended by a driver, even under a condition that an understeer tendency of the vehicle becomes strong.

BRIEF DESCRIPTION OF DRAWINGS

FIGS. 6A and 6B are maps depicting a relationship between a deceleration reduction amount correction coefficient to be decided by the vehicle behavior control device according to this embodiment, and an understeer-causing state of a vehicle which is a factor causing understeer, wherein FIG. 6A is a map depicting a relationship between the deceleration reduction amount correction coefficient and a gross vehicle weight, and FIG. 6B is a map depicting a relationship between the deceleration reduction amount correction coefficient and elapsed years after tire installation.

FIGS. 7A to 7G are diagrams depicting a temporal change of each parameter pertaining to engine control to be performed by the vehicle behavior control device according to this embodiment during turning of a vehicle equipped with the vehicle behavior control device, wherein: FIG. 7A is a top plan view schematically depicting the vehicle which is turning in a clockwise direction; FIG. 7B is a diagram depicting a change in steering wheel angle of the vehicle which is turning in the clockwise direction as depicted in FIG. 7A; FIG. 7C is a diagram depicting a change in steering speed of the vehicle which is turning in the clockwise direction as depicted in FIG. 7A; FIG. 7D is a diagram depicting a change in additional deceleration decided based on the steering speed depicted in FIG. 7C; FIG. 7E is a diagram depicting a change in torque reduction amount decided based on the additional deceleration depicted in FIG. 7D; FIG. 7F is a diagram depicting a change in final target torque decided based on a basic target torque and the torque reduction amount; and FIG. 7G is a diagram depicting a change in yaw rate (actual yaw rate) generated in the vehicle when the engine control is performed based on the final target torque depicted in FIG. 7F, and a change in actual yaw rate generated in the vehicle when the engine control based on the torque reduction amount decided by a torque reduction amount-deciding part is not performed.

DESCRIPTION OF EMBODIMENTS

With reference to the accompanying drawings, a vehicle behavior control device according to one embodiment of the present invention will now be described.

Figure 1:
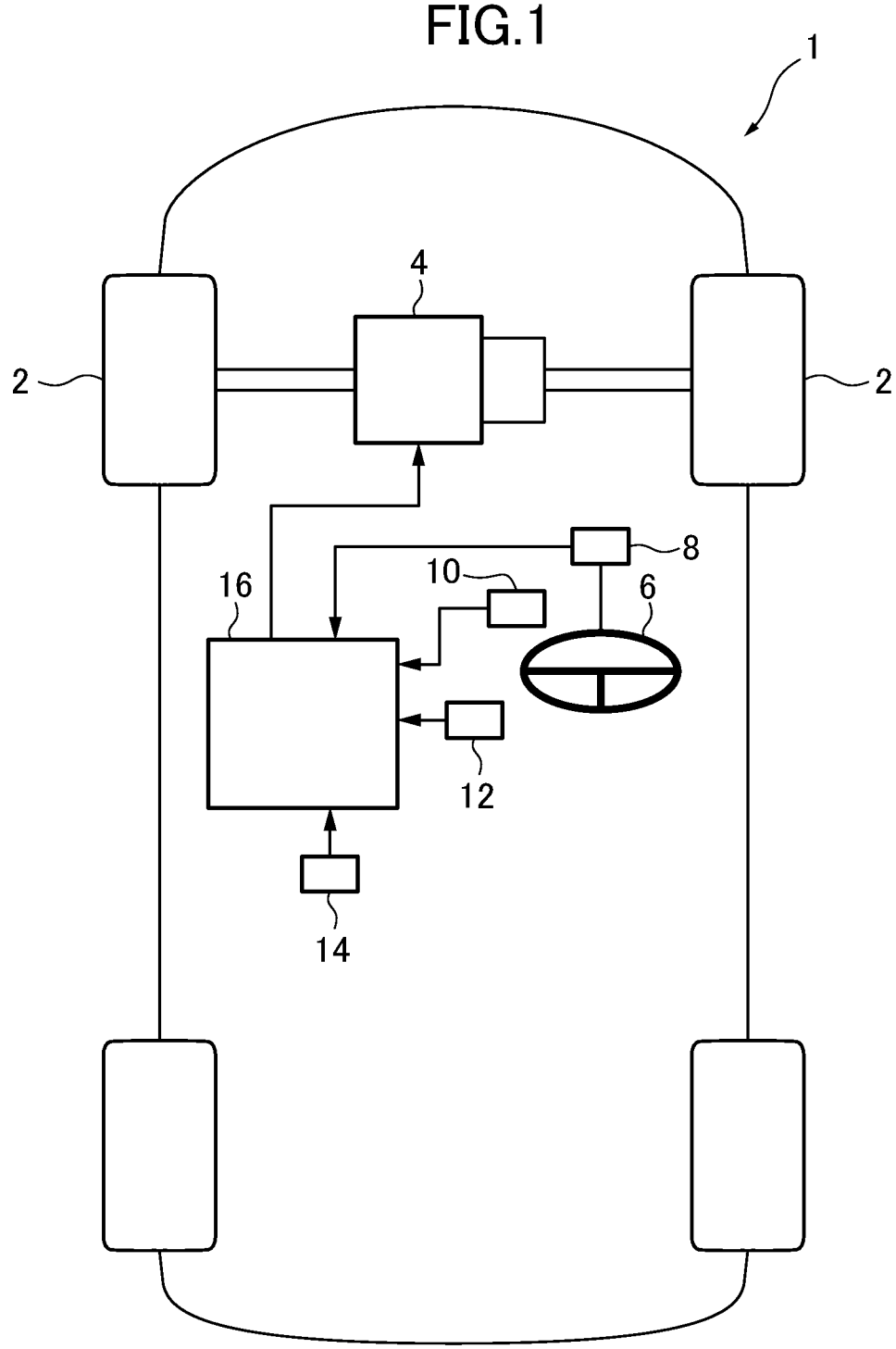
FIG. 1 is a block diagram depicting an entire configuration of a vehicle equipped with a vehicle behavior control device according to one embodiment of the present invention.

First of all, with reference to FIG. 1, a vehicle equipped with the vehicle behavior control device according to this embodiment will be described. FIG. 1 is a block diagram depicting an entire configuration of the vehicle equipped with the vehicle behavior control device according to this embodiment.

In FIG. 1, the reference sign 1 denotes the vehicle equipped with the vehicle behavior control device according to this embodiment. A vehicle body of the vehicle 1 has a front portion on which an engine 4 for driving drive road wheels (in the vehicle depicted in FIG. 1, right and left front road wheels 2) is mounted. The engine 4 is an internal combustion engine such as a gasoline engine or a diesel engine.

The vehicle 1 has: a steering wheel angle sensor 8 for detecting a rotational angle of a steering wheel 6 (steering wheel angle); an accelerator position sensor 10 for detecting an amount of depression of an accelerator pedal (accelerator position); a vehicle speed sensor 12 for detecting a vehicle speed; and an acceleration sensor 14 for detecting an acceleration of the vehicle. Each of the above sensors is operable to output a detection value to a PCM (Power-train Control Module) 16.

Figure 2:
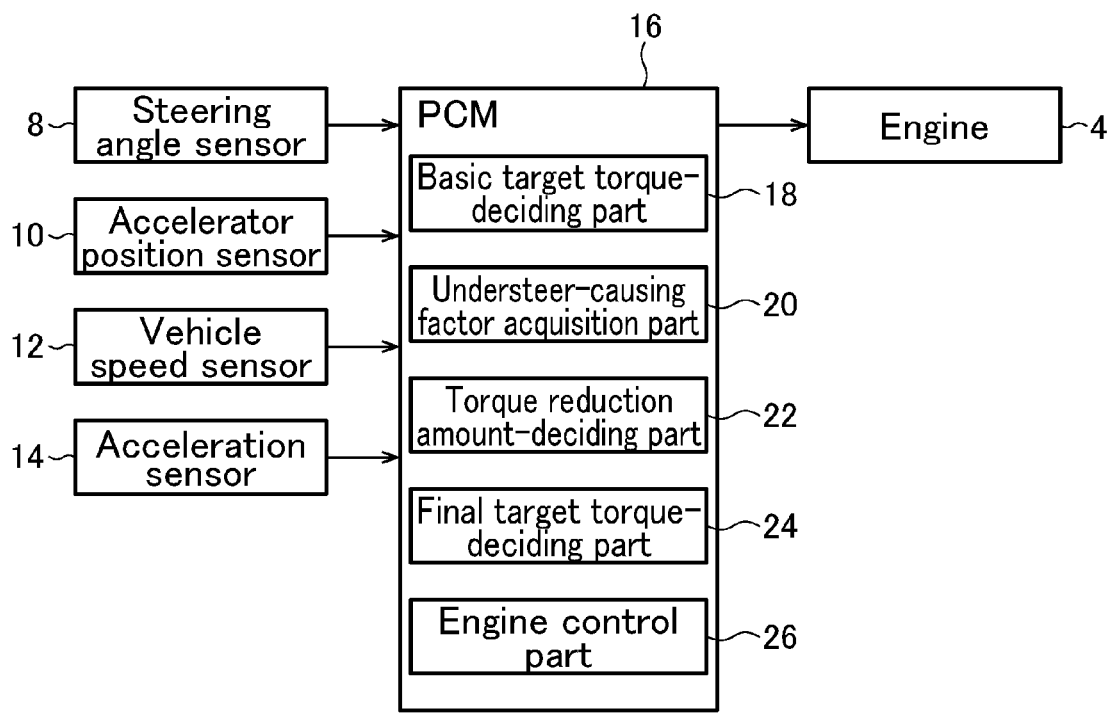
FIG. 2 is a block diagram depicting an electrical configuration of the vehicle behavior control device according to this embodiment.

Next, with reference to FIG. 2, an electrical configuration of the vehicle behavior control device according to this embodiment will be described. FIG. 2 is a block diagram depicting the electrical configuration of the vehicle behavior control device according to this embodiment.

The PCM 16 (vehicle behavior control device) according to this embodiment is configured to, based on detection signals output from the above sensors 8 to 14, and detection signals output from various other sensors for detecting an operating state of the engine 4, generate and output control signals to perform controls with respect to various components (e.g., a throttle valve, a turbocharger, a variable valve mechanism, an ignition unit, a fuel injection valve, and an EGR unit) of the engine 4.

The PCM 16 comprises: a basic target torque-deciding part 18 for deciding a basic target torque based on a driving state of the vehicle 1 including an accelerator pedal operation; an understeer-causing factor acquisition part 20 for acquiring an understeer-causing state of the vehicle 1 which is a factor causing understeer; a torque reduction amount-deciding part 22 for deciding a torque reduction amount for adding a deceleration to the vehicle 1 based on a yaw rate-related quantity of the vehicle 1; a final target torque-deciding part 24 for deciding a final target torque based on the basic target torque and the torque reduction amount; and an engine control part 26 for controlling the engine 4 to cause the engine 4 to output the final target torque. This embodiment will be described based on an assumption that the torque reduction amount-deciding part 22 is configured to use steering speed of the vehicle 1 as the yaw rate-related quantity.

The above components of the PCM 16 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

Next, with reference to FIGS. 3 to 6B, processing to be performed by the vehicle behavior control device will be described.

Figure 3:
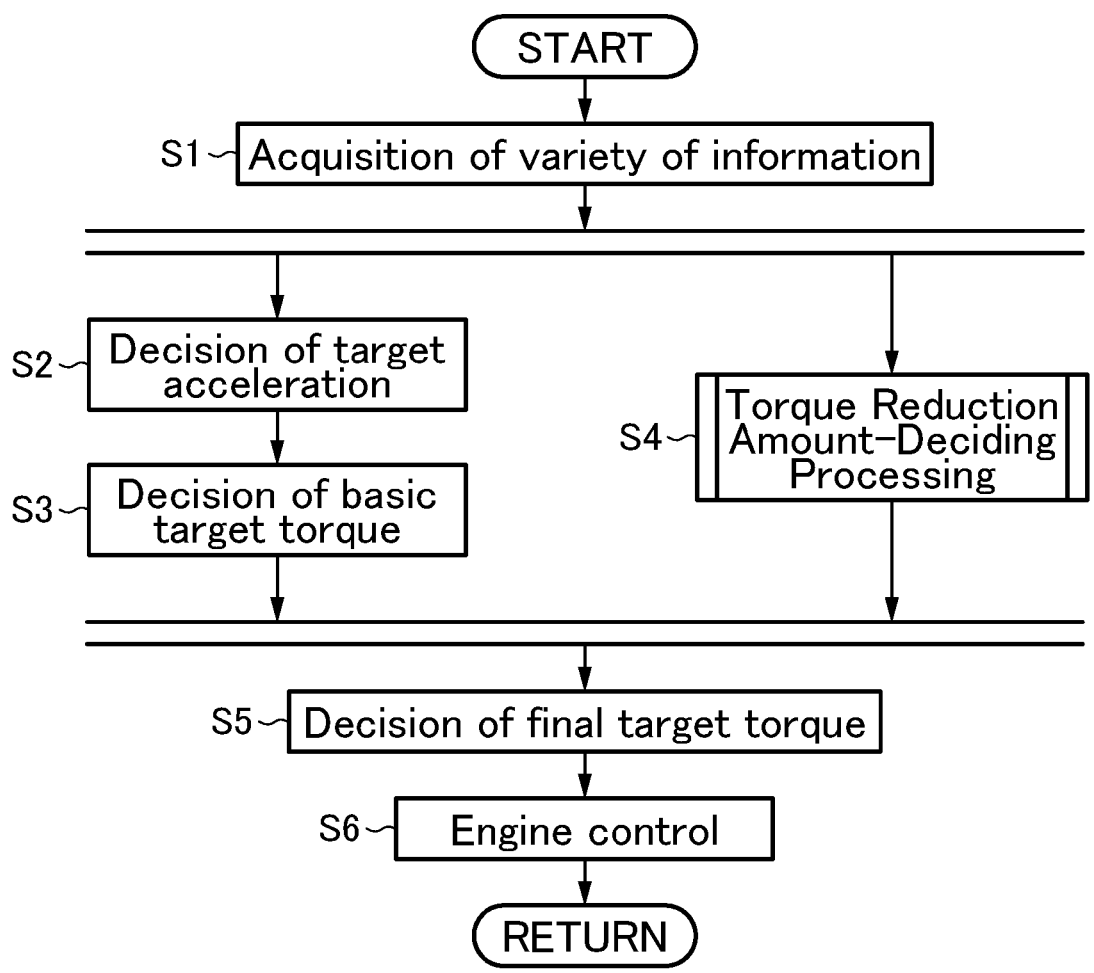
FIG. 3 is a flowchart depicting engine control processing to be performed by the vehicle behavior control device according to this embodiment, so as to control an engine.
Figure 4:
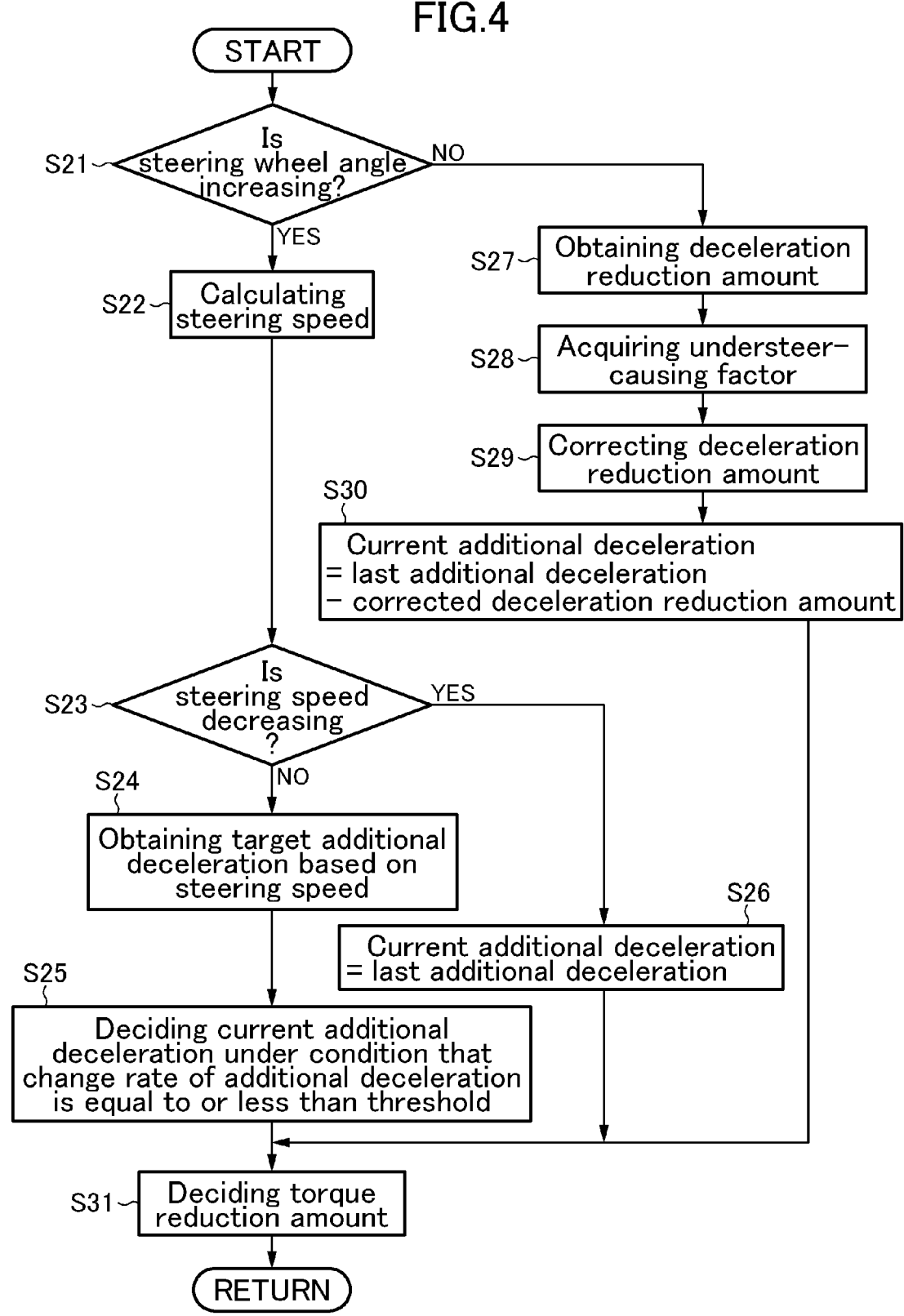
FIG. 4 is a flowchart depicting torque reduction amount-deciding processing to be performed by the vehicle behavior control device according to this embodiment, so as to decide a torque reduction amount.
Figure 5:
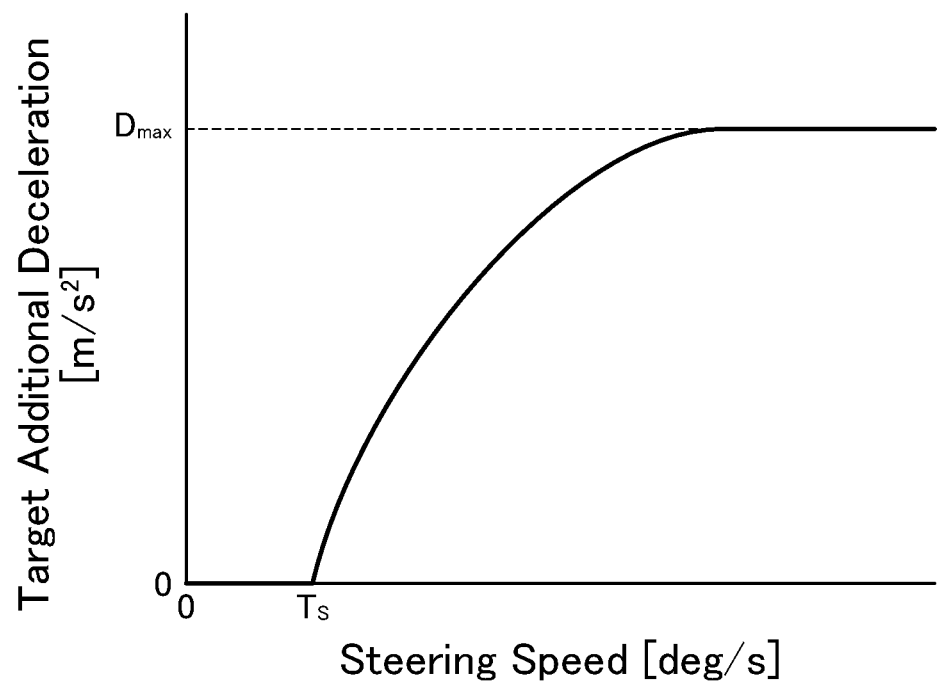
FIG. 5 is a map depicting a relationship between a steering speed, and a target additional deceleration to be decided by the vehicle behavior control device according to this embodiment.
Figure 6A:
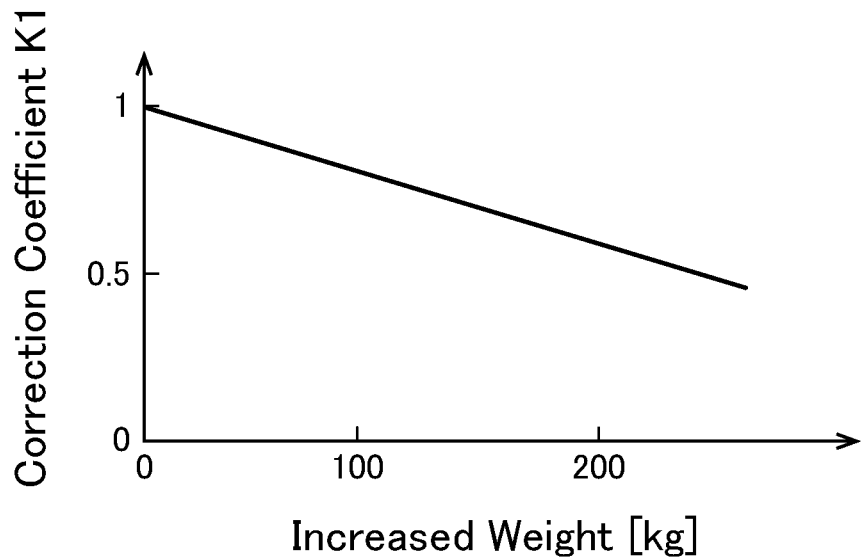
Figure 6B:
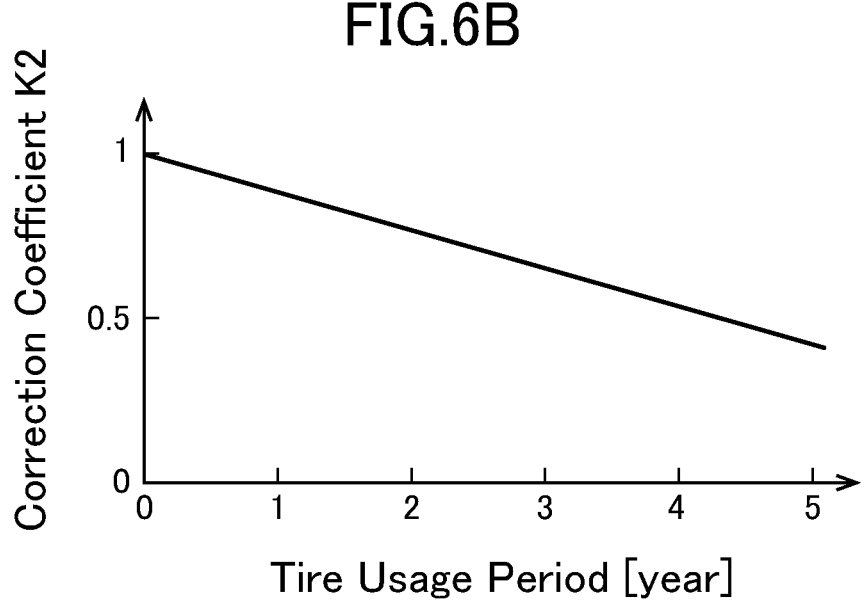

FIG. 3 is a flowchart depicting engine control processing to be performed by the vehicle behavior control device according to this embodiment, so as to control the engine 4, and FIG. 4 is a flowchart depicting torque reduction amount-deciding processing to be performed by the vehicle behavior control device according to this embodiment, so as to decide the torque reduction amount. FIG. 5 is a map depicting a relationship between the steering speed, and a target additional deceleration to be decided by the vehicle behavior control device according to this embodiment, and FIGS. 6A and 6B are maps depicting a relationship between a deceleration reduction amount correction coefficient to be decided by the vehicle behavior control device according to this embodiment, and the understeer-causing state of the vehicle.

The engine control processing in FIG. 3 is activated when an ignition switch of the vehicle 1 is turned on to apply power to the vehicle behavior control device, and repeatedly executed with a given cycle period.

As depicted in FIG. 3, upon start of the engine control processing, in step S1, the PCM 16 operates to acquire a variety of information about the driving state of the vehicle 1. Specifically, the PCM 16 operates to acquire, as information about the driving state, detection signals output from the aforementioned sensors, including the steering wheel angle detected by the steering wheel angle sensor 8, the accelerator position detected by the accelerator position sensor 10, the vehicle speed detected by the vehicle speed sensor 12, the acceleration detected by the acceleration sensor 14, and a gear stage currently set in a transmission of the vehicle 1. The PCM 16 further operates to acquire information for specifying an elapsed period of time after installation of tires in the vehicle 1 (as needed, this elapsed period of time will hereinafter be referred to as "tire usage period", and the information will hereinafter be referred to as "tire usage period information"). As the tire usage period information, it is possible to use, for example, date of tire installation which was preliminarily input into a storage unit of the vehicle 1 at the time of vehicle manufacturing or the time of tire change, and date of tire manufacturing which was preliminarily input into a storage unit provided in a tire itself.

Subsequently, in step S2, the basic target torque-deciding part 18 of the PCM 16 operates to set a target acceleration based on the driving state of the vehicle 1 including the accelerator pedal operation, acquired in the step S1. Specifically, the basic target torque-deciding part 18 operates to select, from a plurality of acceleration characteristic maps defined with respect to various vehicle speeds and various gear stages (the maps are preliminarily created and stored in a memory or the like), one acceleration characteristic map corresponding to a current vehicle speed and a current gear stage, and decide a target acceleration corresponding to a current accelerator position, with reference to the selected acceleration characteristic map.

Subsequently, in step S3, the basic target torque-deciding part 18 operates to decide the basic target torque of the engine 4 for realizing the target acceleration decided in the step S2. In this embodiment, the basic target torque-deciding part 18 operates to decide the basic target torque within a torque range outputtable by the engine 4, based on current vehicle speed, gear stage, road grade, road surface mu (μ), etc.

In parallel to the processing in the steps S2 and S3, in step S4, the torque reduction amount-deciding part 22 operates to perform the torque reduction amount-deciding processing of deciding the torque reduction amount for adding a deceleration to the vehicle 1, based on a steering wheel operation. This torque reduction amount-deciding processing will be described with reference to FIG. 4.

As depicted in FIG. 4, upon start of the torque reduction amount-deciding processing, in step S21, the torque reduction amount-deciding part 22 operates to determine whether or not an absolute value of the steering wheel angle acquired in the step S1 is increasing. As a result, when the absolute value of the steering wheel angle is increasing, the subroutine proceeds to step S22. In the step S22, the torque reduction amount-deciding part 22 operates to calculate the steering speed based on the steering wheel angle acquired in the step S1.

Subsequently, in step S23, the torque reduction amount-deciding part 22 operates to determine whether an absolute value of the calculated steering speed is decreasing.

As a result, when the absolute value of the calculated steering speed is not decreasing, i.e., the absolute value of the calculated steering speed is increasing or the absolute value of the steering speed does not change, the subroutine proceeds to step S24. In the step S24, the torque reduction amount-deciding part 22 operates to obtain the target additional deceleration based on the calculated steering speed. This target additional deceleration is a deceleration to be added to the vehicle 1 according to the steering wheel operation in order to accurately realize a vehicle behavior which is intended by a driver.

Specifically, the torque reduction amount-deciding part 22 operates to obtain a value of the target additional deceleration corresponding to the steering speed calculated in the step S22, based on a relationship between the target additional deceleration and the steering speed, shown by the map in FIG. 5.

In FIG. 5, the horizontal axis denotes the steering speed, and the vertical axis denotes the target additional deceleration. As depicted in FIG. 5, when the steering speed is equal to or less than a threshold $T_S$, a corresponding value of the target additional deceleration is 0. That is, when the steering speed is equal to or less than the threshold $T_S$, the PCM 16 operates to stop control of adding a deceleration to the vehicle 1 (specifically, reduce an output torque of the engine 4) based on the steering wheel operation.

On the other hand, when the steering speed is greater than the threshold $T_S$, as the steering speed is increased to a higher value, a value of the target additional deceleration corresponding to the steering speed comes closer to a given upper limit value $D_{max}$ (e.g., 1 m/s$^2$). That is, as the steering speed is increased to a higher value, the target additional deceleration is increased to a larger value, and a rate of increase of the target additional deceleration becomes smaller.

Subsequently, in step S25, the torque reduction amount-deciding part 22 operates to decide an additional deceleration in the current processing cycle, under a condition that an increase rate of the additional deceleration is equal to or less than a threshold $R_{max}$ (e.g., 0.5 m/s$^3$).

Specifically, the torque reduction amount-deciding part 22 operates to, when an increase rate from a value of the additional deceleration decided in the last processing cycle to a value of the target additional deceleration obtained in the step S24 in the current processing cycle is equal to or less than the threshold $R_{max}$, decide the value of the target additional deceleration obtained in the step S24, as a value of the additional deceleration in the current processing cycle.

On the other hand, the torque reduction amount-deciding part 22 operates to, when the increase rate from the value of the additional deceleration decided in the last processing cycle to the value of the target additional deceleration obtained in the step S24 in the current processing cycle is greater than the threshold $R_{max}$, decide, as the value of the additional deceleration in the current processing cycle, a value obtained by increasing the value of the additional deceleration decided in the last processing cycle, at the increase rate $R_{max}$.

Referring to the step S23 again, when the absolute value of the steering speed is decreasing, the subroutine proceeds to step S26. In the step S26, the torque reduction amount-deciding part 22 operates to decide the value of the additional deceleration decided in the last processing cycle, as the value of the additional deceleration in the current processing cycle. That is, when the absolute value of the steering speed is decreasing, a value of the additional deceleration corresponding to a maximum value of the steering speed (i.e., a maximum value of the additional deceleration) is maintained.

Referring to the step S21 again, when the absolute value of the steering wheel angle is not increasing (i.e., is maintained constant or is decreasing), the subroutine proceeds to step S27. In the step S27, the torque reduction amount-deciding part 22 operates to obtain an amount (deceleration reduction amount) by which the value of the additional deceleration decided in the last processing cycle is to be reduced in the current processing cycle. For example, the deceleration reduction amount may be calculated based on a constant reduction rate (e.g., 0.3 m/s$^3$) preliminarily stored in a memory or the like. Alternatively, the deceleration reduction amount may be calculated based on a reduction rate decided according to the driving state of the vehicle 1 acquired in the step S1 and/or the steering speed calculated in Step S22.

Subsequently, in step S28, the understeer-causing factor acquisition part 20 operates to acquire an understeer-causing state of the vehicle 1 which is a factor causing understeer, specifically, a gross weight of the vehicle 1 and an elapsed time after installation of tires in the vehicle 1.

For example, the understeer-causing factor acquisition part 20 operates to acquire the gross weight of the vehicle 1, based on a current gear stage, an output torque of the engine 4, and the acceleration of the vehicle 1 acquired in the step S1 in FIG. 3. The understeer-causing factor acquisition part 20 further operates to specify the elapsed time after installation of tires in the vehicle 1, based on the tire usage period information acquired in the step S1 in FIG. 3.

Subsequently, in step S29, the torque reduction amount-deciding part 22 operates to correct the deceleration reduction amount obtained in the step S27, based on the gross weight of the vehicle 1 and the tire usage period acquired in the step S28.

Specifically, the torque reduction amount-deciding part 22 operates to, based on a relationship between a deceleration reduction amount correction coefficient K1 and a gross vehicle weight, shown by the map in FIG. 6A, and a relationship between a deceleration reduction amount correction coefficient K2 and a tire usage period, shown by the map in FIG. 6B, obtain respective values of the correction coefficients K1, K2 corresponding to the gross weight of the vehicle 1 and the tire usage period acquired in the step S28.

In FIG. 6A, the horizontal axis represents an increased weight of an actual gross vehicle weight with respect to a gross vehicle weight in a state in which only one driver rides on the vehicle 1 without loading any luggage thereon (i.e., the gross weight of the vehicle 1 acquired in the step S28), and the vertical axis represents the correction coefficient K1. As depicted in FIG. 6A, as the increased weight becomes larger, the correction coefficient K1 becomes smaller.

In FIG. 6B, the horizontal axis represents the tire usage period, and the vertical axis represents the correction coefficient K2. As depicted in FIG. 6B, as the tire usage period becomes longer, the correction coefficient K2 becomes smaller.

The torque reduction amount-deciding part 22 operates to calculate a corrected deceleration reduction amount by multiplying the deceleration reduction amount obtained in the step S27 by the correction coefficients K1, K2 acquired in the above manner.

Returning to FIG. 4, in step S30, the torque reduction amount-deciding part 22 operates to subtract the corrected deceleration reduction amount calculated in the step S29 from the value of the additional deceleration decided in the last processing cycle, to thereby decide the additional deceleration in the current processing cycle.

After completion of the step S25, S26 or S30, in step S31, the torque reduction amount-deciding part 22 operates to decide the torque reduction amount, based on the current additional deceleration decided in the step S25, S26 or S30. Specifically, the torque reduction amount-deciding part 22 operates to decide a value of the torque reduction amount required for realizing the current additional deceleration, based on the current vehicle speed, gear stage, road gradient and others acquired in the Step S1. After completion of the step S31, the torque reduction amount-deciding part 22 operates to terminate the torque reduction amount-deciding processing, and the engine control processing routine returns to the main routine.

Returning to FIG. 3, after performing the processing in the steps S2 and S3 and the torque reduction amount-deciding processing in the step S4, in step S5, the final target torque-deciding part 24 operates to subtract a value of the torque reduction amount decided by the torque reduction amount-deciding processing in the step S4, from a value of a basic target torque after being subjected to smoothing in the step S3, to thereby decide the final target torque.

Subsequently, in step S6, the engine control part 26 operates to control the engine 4 to cause the engine 4 to output the final target torque set in the step S5. Specifically, the engine control part 26 operates to, based on the final target torque set in the step S5 and an engine speed, decide various engine state amounts (e.g., air charge amount, fuel injection amount, intake-air temperature, and oxygen concentration) required for realizing the final target torque set in the step S5, and then, based on the decided state amounts, control a plurality of actuators for driving various components of the engine 4. In this case, the engine control part 26 operates to perform engine control in such a manner as to set a limit value or range with respect to each of the state amounts, and set a controlled variable of each actuator to allow its related state amount to preserve limitation by the limit value or range.

After completion of the step S6, the PCM 16 operates to terminate the engine control processing.

Next, with reference to FIGS. 7A to 7G, an operation of the vehicle behavior control device according to this embodiment will be described. FIGS. 7A to 7G are diagrams depicting a temporal change of each parameter pertaining to the engine control to be performed by the vehicle behavior control device according to this embodiment during turning of the vehicle 1 equipped with the vehicle behavior control device.

Figure 7A:
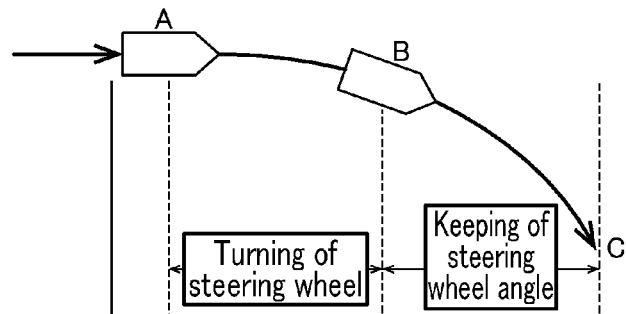

FIG. 7A is a top plan view schematically depicting the vehicle 1 which is turning in a clockwise direction. As depicted in FIG. 6A, the vehicle 1 starts to turn from a position A, and continues to turn from a position B to a position C in the clockwise direction at a constant steering wheel angle.

Figure 7B:
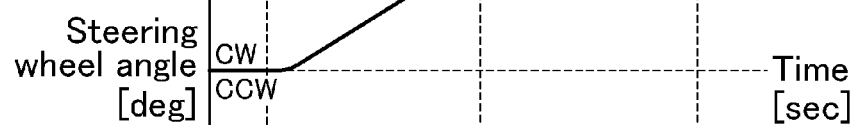

FIG. 7B is a diagram depicting a change in steering wheel angle of the vehicle 1 which is turning in the clockwise direction as depicted in FIG. 7A. In FIG. 7B, the horizontal axis represents the time, and the vertical axis represents the steering wheel angle.

As depicted in FIG. 7B, clockwise steering is started at the position A, and then, along with an additional turning operation of the steering wheel, a clockwise steering wheel angle gradually increases and reaches a maximum value at the position B. Subsequently, the steering wheel angle is maintained constant until the vehicle 1 reaches the position C (Keeping of the steering wheel angle).

Figure 7C:

FIG. 7C is a diagram depicting a change in steering speed of the vehicle 1 which is turning in the clockwise direction as depicted in FIG. 7B. In FIG. 7C, the horizontal axis represents the time, and the vertical axis represents the steering speed.

The steering speed of the vehicle 1 is expressed as a temporal differentiation of the steering wheel angle of the vehicle 1. That is, as depicted in FIG. 7C, when clockwise steering is started at the position A, a clockwise steering speed arises and is maintained approximately constant in an intermediate zone between the position A and the position B. Then, when the clockwise steering speed decreases and the clockwise steering wheel angle reaches the maximum value at the position B, the steering speed becomes 0. Then, when the steering wheel angle is maintained during traveling from the position B to the position C, the steering speed is kept at 0.

Figure 7D:

FIG. 7D is a diagram depicting a change in the additional deceleration decided based on the steering speed depicted in FIG. 7C. In FIG. 7D, the horizontal axis represents the time, and the vertical axis represents the additional deceleration. In FIG. 7D, the solid line indicates a change in the additional deceleration decided in the torque reduction amount-deciding processing in FIG. 4, and the one-dot chain line indicates a change in the target additional deceleration based on the steering speed. As with the change in the steering speed depicted in FIG. 7C, the target additional deceleration indicated by the one-dot chain line starts increasing from the position A, and is maintained approximately constant in an intermediate zone between the position A and the position B, whereafter it decreases, and becomes 0 at the position B. The two-dot chain line in FIG. 7D indicates a change in the target additional deceleration in response to a change in the understeer-causing state of the vehicle 1.

As described with reference to FIG. 4, when the steering wheel angle is determined in the step S21 to be increasing, and the absolute value of the steering speed is determined in the step S23 to be not decreasing, i.e., to be increasing or to have no change, the torque reduction amount-deciding part 22 operates in the step S24 to obtain the target additional deceleration based on the steering speed. Subsequently, in the step S25, the torque reduction amount-deciding part 22 operates to decide the additional deceleration in each processing cycle, under the condition that the increase rate of the additional deceleration is equal to or less than the threshold $R_{max}$.

FIG. 7D depicts a case where an increase rate of the target additional deceleration starting increasing from the position A is greater than the threshold $R_{max}$. In this case, the torque reduction amount-deciding part 22 operates to increase the last additional deceleration at an increase rate equal to the threshold $R_{max}$ (i.e., at an increase rate providing a gentler slope than that of the target additional deceleration indicated by the one-dot chain line). Then, when the target additional deceleration is maintained approximately constant in the intermediate zone between the position A and the position B, the torque reduction amount-deciding part 22 operates to decide that the additional deceleration is equal to the target additional deceleration.

Then, when the absolute value of the steering speed is determined, in the step S23 depicted in FIG. 4, to be decreasing, the torque reduction amount-deciding part 22 operates to maintain the additional deceleration at the maximum steering speed, as mentioned above. Specifically, in FIG. 7D, when the steering speed decreases toward the position B, the target additional deceleration indicated by the one-dot chain line also decreases along therewith, but the additional deceleration indicated by the solid line is maintained at its maximum value, until the vehicle 1 reaches the position B.

On the other hand, when the absolute value of the steering speed is determined, in the step S21 depicted in FIG. 4, to be maintained constant or to be decreasing, the torque reduction amount-deciding part 22 operates in the step S29 to correct the deceleration reduction amount obtained in the step S27, based on the gross weight of the vehicle 1 and the tire usage period acquired in the step S28, and operates in the step S30 to reduce the additional deceleration by the corrected deceleration reduction amount, as mentioned above. As depicted in FIG. 7D, the torque reduction amount-deciding part 22 operates to reduce the last additional deceleration to cause a reduction rate of the additional deceleration to become gradually smaller, i.e., to cause a slope of the solid line indicative of a change in the additional deceleration to become gradually gentler.

As described with reference to FIGS. 6A and 6B, as the gross weight of the vehicle 1 becomes larger, the correction coefficient K1 becomes smaller, and, as the tire usage period becomes longer, the correction coefficient K2 becomes smaller. Thus, as the gross weight of the vehicle 1 becomes larger or as the tire usage period becomes longer, the corrected deceleration reduction amount becomes smaller, and the reduction rate of the additional deceleration becomes smaller. That is, as the gross weight of the vehicle 1 becomes larger or as the tire usage period becomes longer, a slope of a curve indicative of a change in the additional deceleration becomes gentler, as indicated by the two-dot chain line in FIG. 7D.

Figure 7E:
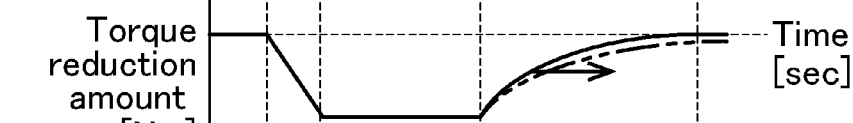

FIG. 7E is a diagram depicting a change in the torque reduction amount decided based on the additional deceleration depicted in FIG. 7D. In FIG. 7E, the horizontal axis represents the time, and the vertical axis represents the torque reduction amount.

As mentioned above, the torque reduction amount-deciding part 22 operates to decide a value of the torque reduction amount required for realizing an additional deceleration, based on the current vehicle speed, gear stage, road gradient and others. Thus, in the case where respective values of these parameters are constant, the torque reduction amount is decided such that it changes in the same pattern as that of the additional deceleration depicted in FIG. 7D.

Therefore, assume the case where the absolute value of the steering speed is determined to be maintained constant or to be decreasing, and the torque reduction amount-deciding part 22 operates in the step S30 to reduce the additional deceleration by the corrected deceleration reduction amount. In this case, as the gross weight of the vehicle 1 becomes larger or as the tire usage period becomes longer, the reduction rate of the additional deceleration becomes smaller, as described with reference to FIG. 7D, and thereby a reduction rate of the torque reduction amount also become smaller. That is, as the gross weight of the vehicle 1 becomes larger or as the tire usage period becomes longer, a slope of a curve indicative of a change in the torque reduction amount becomes gentler, as indicated by the two-dot chain line in FIG. 7E.

Figure 7F:
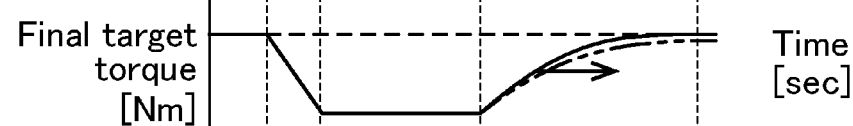

FIG. 7F is a diagram depicting a change in the final target torque decided based on the basic target torque and the torque reduction amount. In FIG. 7F, the horizontal axis represents the time, and the vertical axis represents the torque. In FIG. 7F, the dotted line indicates the basic target torque, and the solid line indicates the final target torque.

As described with reference to FIG. 3, the final target torque-deciding part 24 operates to subtract the value of the torque reduction amount decided by the torque reduction amount-deciding processing in the step S4, from the value of the basic target torque decided in the step S3, to thereby decide the final target torque. Thus, in the case where the basic target torque is constant, the final target torque is decided such that it changes in the same pattern as that of the torque reduction amount depicted in FIG. 7E.

Therefore, assume the case where the absolute value of the steering speed is determined to be maintained constant or to be decreasing, and the torque reduction amount-deciding part 22 operates in the step S30 to reduce the additional deceleration by the corrected deceleration reduction amount. In this case, as the gross weight of the vehicle 1 becomes larger or as the tire usage period becomes longer, the reduction rate of the torque reduction amount becomes smaller, as described with reference to FIG. 7E, and thereby a change rate during increasing of the final target torque also become smaller. That is, as the gross weight of the vehicle 1 becomes larger or as the tire usage period becomes longer, a slope of a curve indicative of an increase in the final target torque becomes gentler, as indicated by the two-dot chain line in FIG. 7F.

Figure 7G:
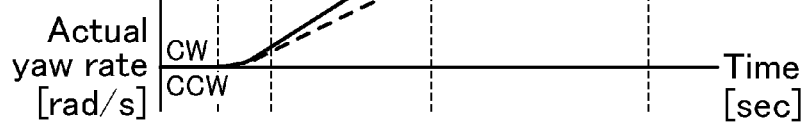

FIG. 7G is a diagram depicting a change in yaw rate (actual yaw rate) generated in the vehicle 1 when control of the engine 4 is performed based on the final target torque depicted in FIG. 7F, and a change in actual yaw rate generated in the vehicle 1 when the control of the engine 4 based on the torque reduction amount decided by the torque reduction amount-deciding part is not performed (i.e., the control of the engine 4 is performed so as to realize the basic target torque indicated by the dotted line in FIG. 7F). In FIG. 7G, the horizontal axis represents the time, and the vertical axis represents the yaw rate. Further, in FIG. 7G, the solid line indicates a change in the yaw rate (actual yaw rate) generated when the control of the engine 4 is performed so as to realize the final target torque, and the dotted line indicates a change in the actual yaw rate generated when the control compatible with the torque reduction amount is not performed.

When clockwise steering is started at the position A, and the torque reduction amount is increased along with an increase in the clockwise steering speed, as depicted in FIG. 7E, to reduce the final target torque as depicted in FIG. 7F, a load applied to the front road wheels 2 as steerable road wheels of the vehicle 1 is increased. As a result, a frictional force between each of the front road wheels 2 and a road surface is increased and thus a cornering force of the front road wheels 2 is increased, thereby providing an improved turn-in ability of the vehicle 1. That is, as depicted in FIG. 7G, when the control of the engine 4 is performed in the intermediate zone between the position A and the position B so as to realize the final target torque reflecting the torque reduction amount (solid line), a larger clockwise (CW) yaw rate is generated in the vehicle, as compared to the case where the control compatible with the torque reduction amount is not performed (dotted line).

Then, as depicted in FIGS. 7D and 7E, although the target additional deceleration decreases along with a decrease in the steering speed toward the position B, the load applied to the front road wheels is maintained as long as the tuning of the steering wheel is continued, because the torque reduction amount is maintained at its maximum value. Thus, it becomes possible to maintain the turn-in ability of the vehicle 1.

Then, when the absolute value of the steering wheel angle is maintained constant during traveling from the position B to the position C, the torque reduction amount is smoothly reduced to smoothly increase the final target torque. Thus, in response to completion of the turning of the steering wheel, the load applied to the front road wheels 2 can be gradually reduced to gradually reduce the cornering force of the front road wheels 2, thereby restoring the output torque of the engine 4, while stabilizing a vehicle body. In particular, as depicted in FIG. 7F, as the gross weight of the vehicle 1 becomes larger or as the tire usage period becomes longer, a change rate during increasing of the final target torque become smaller. Thus, as an understeer tendency of the vehicle becomes stronger due to the increase in gross vehicle weight and the tire aging degradation, a change rate during the reducing of the load applied to the front road wheels 2 is reduced to a smaller value to allow the cornering force of the front road wheels 2 to be moderately reduced.

Next, some modifications of the above embodiment will be described.

Although the above embodiment has been described based on an example in which the torque reduction amount-deciding part 22 is configured to obtain a target additional deceleration based on the steering speed as the yaw rate-related quantity, and decide a torque reduction amount based on the obtained target additional deceleration, the torque reduction amount-deciding part 22 may be configured to decide a torque reduction amount based on any driving state of the vehicle 1 other than the accelerator pedal operation (e.g., steering wheel angle, yaw rate, or slip ratio).

For example, the torque reduction amount-deciding part 22 may be configured to calculate, as the yaw rate-related quantity, a target yaw acceleration to be generated in the vehicle 1, based on a target yaw rate calculated from the steering wheel angle and the vehicle speed, and a yaw rate input from a yaw rate sensor, and obtain the target additional deceleration based on the calculated target yaw acceleration to decide the torque reduction amount. Alternatively, it is also possible to detect, by the acceleration sensor, a lateral acceleration to be generated in the vehicle 1 along with turning of the vehicle 1, as the yaw rate-related quantity, and decide the torque reduction amount based on the detected lateral acceleration.

The above embodiment has been described based on an example in which the vehicle 1 equipped with the vehicle behavior control device has the engine 4 for driving drive road wheels. However, the vehicle behavior control device of the present invention may also be applied to a vehicle having a motor for driving the drive road wheels by electric power supplied from a battery or a capacitor. In this case, the PCM 16 may be configured to perform control to reduce a torque of the motor according to the steering speed of the vehicle 1.

The above embodiment has been described based on an example in which, as the tire usage period acquired by the understeer-causing factor acquisition part 20 becomes longer, the deceleration reduction amount correction coefficient K2 is reduced to a smaller value, and the change rate during the increasing of the final target torque is reduced to a smaller value. Alternatively, as a traveling distance after installation of tires in the vehicle 1 becomes longer, each of the deceleration reduction amount correction coefficient and the change rate during the increasing of the final target torque may be reduced to a smaller value.

Next, advantageous effects of the vehicle behavior control device according to the above embodiment and the modifications thereof will be described.

The PCM 16 is operable to reduce the final target torque according to the steering speed, and then increase the final target torque at a change rate decided based on the understeer-causing state of the vehicle 1 acquired by the understeer-causing factor acquisition part 20, so that, when the final target torque is increased to reduce a load applied to the front road wheels and thus reduce a cornering force of the front road wheels, the cornering force of the front road wheels can be reduced at a change rate according to the understeer-causing state of the vehicle 1. Thus, under the condition that an understeer tendency of the vehicle becomes strong due to an increase in gross vehicle weight, or tire aging degradation, it becomes possible to reduce the cornering force of the front road wheels at a change rate according to the increase in gross vehicle weight or the tire aging degradation, to thereby suppress the occurrence of understeer and thus perform a vehicle behavior control so as to accurately realize a behavior of the vehicle 1 as intended by a driver, as well as before the occurrence of the increase in gross vehicle weight or the tire aging degradation.

In particular, the PCM 16 is operable to reduce the change rate during the increasing of the final target torque to a smaller value, as the gross weight of the vehicle 1 acquired by the understeer factor acquisition part 20 becomes larger, so that, when the final target torque is increased to reduce a load applied to the front road wheels and thus reduce a cornering force of the front road wheels, a change rate during the reducing of the load applied to the front road wheels 2 can be reduced to a smaller value as the gross weight of the vehicle 1 becomes larger, to thereby allow the cornering force of the front road wheels 2 to be moderately reduced. Thus, under the condition that an understeer tendency of the vehicle becomes strong due to an increase in gross vehicle weight, it becomes possible to moderately reduce the cornering force of the front road wheels according to the increase in gross vehicle weight, to thereby suppress the occurrence of understeer and thus perform a vehicle behavior control so as to accurately realize a behavior of the vehicle 1 as intended by a driver, as well as before the occurrence of the increase in gross vehicle weight.

The PCM 16 is operable to reduce the change rate during the increasing of the final target torque to a smaller value, as the tire usage period acquired by the understeer factor acquisition part 20 becomes larger, so that, when the final target torque is increased to reduce a load applied to the front road wheels and thus reduce a cornering force of the front road wheels, a change rate during the reducing of the load applied to the front road wheels 2 can be reduced to a smaller value as the tire usage period becomes longer, to thereby allow the cornering force of the front road wheels 2 to be moderately reduced. Thus, under the condition that an understeer tendency of the vehicle becomes strong due to tire aging degradation, it becomes possible to moderately reduce the cornering force of the front road wheels according to the tire aging degradation to thereby suppress the occurrence of understeer and thus perform a vehicle behavior control so as to accurately realize a behavior of the vehicle 1 as intended by a driver, as well as before the occurrence of the tire aging degradation.

The PCM 16 is operable, when the steering wheel angle is increasing and the yaw rate-related quantity is increasing, to reduce the final target torque according to the steering wheel angle being increasing, and, subsequently, when the steering wheel angle decreases or becomes constant, to increase the final target torque. Thus, when a load applied to the front road wheels is reduced in response to completion of a steering wheel turning operation to reduce a cornering force of the front road wheels, it becomes possible to reduce the cornering force of the front road wheels at a change rate according to the increase in gross vehicle weight, the tire aging degradation or the like, to thereby suppress the occurrence of understeer and thus perform a vehicle behavior control so as to accurately realize a behavior of the vehicle 1 as intended by a driver in a period after the completion of the steering wheel turning operation, as well as before the occurrence of the increase in gross vehicle weight, the tire aging degradation or the like.

What is claimed is:

1. A vehicle behavior control device for controlling a behavior of a vehicle having steerable front road wheels, comprising:
   driving force control part configured to perform control to reduce a driving force for the vehicle according to a yaw rate-related quantity which is related to a yaw rate of the vehicle; and
   understeer-causing factor acquisition part configured to acquire an understeer-causing state of the vehicle which is a factor causing understeer,
   wherein:
   the driving force control part is further configured to perform control to, after reducing the driving force, increase the driving force at a change rate decided based on the understeer-causing state of the vehicle acquired by the understeer-causing factor acquisition part;
   the understeer-causing factor acquisition part is operable to acquire a gross weight of the vehicle, as the understeer-causing state of the vehicle; and
   the driving force control part is operable to reduce a change rate during increasing of the driving force to a smaller value, as the gross weight of the vehicle acquired by the understeer-causing factor acquisition part becomes larger.

2. The vehicle behavior control device as recited in claim 1, wherein the driving force control part is operable, when a steering wheel angle of the vehicle is increasing and the yaw rate-related quantity is increasing, to reduce the driving force according to the yaw rate-related quantity being increasing, and, subsequently, when the steering wheel angle decreases or becomes constant, to increase the driving force.

3. A vehicle behavior control device for controlling a behavior of a vehicle having steerable front road wheels, comprising:
   driving force control part configured to perform control to reduce a driving force for the vehicle according to a yaw rate-related quantity which is related to a yaw rate of the vehicle; and
   understeer-causing factor acquisition part configured to acquire an understeer-causing state of the vehicle which is a factor causing understeer, wherein:
   the driving force control part is further configured to perform control to, after reducing the driving force, increase the driving force at a change rate decided based on the understeer-causing state of the vehicle acquired by the understeer-causing factor acquisition part;
   the understeer-causing factor acquisition part is operable to acquire an elapsed period of time after installation of tires in the vehicle, as the understeer-causing state of the vehicle; and
   the driving force control part is operable to reduce a change rate during increasing of the driving force to a smaller value, as the elapsed period of time after installation of tires in the vehicle, acquired by the understeer-causing factor acquisition part becomes larger.

4. The vehicle behavior control device as recited in claim 3, wherein the driving force control part is operable, when a steering wheel angle of the vehicle is increasing and the yaw rate-related quantity is increasing, to reduce the driving force according to the yaw rate-related quantity being increasing, and, subsequently, when the steering wheel angle decreases or becomes constant, to increase the driving force.

5. A vehicle control device comprising a controller to which at least a steering wheel angle, an accelerator position and a vehicle speed are input, and which is configured to control a driving force output from a driving force generator based on the steering wheel angle, the accelerator position and the vehicle speed, wherein the controller is configured to:
   reduce the driving force so as to generate an additional deceleration to be added to the vehicle according to steering speed, with reference to a map defining the additional deceleration to be set according to the steering speed, when the steering wheel angle is increasing and the steering speed is not decreasing;
   reduce the driving force so as to generate the additional deceleration at the maximum steering speed when the steering wheel angle is increasing and the steering speed is decreasing;
   increase the driving force so as to reduce the additional deceleration when the steering wheel angle is not increasing; and
   reduce a reduction rate of the additional deceleration during the decreasing thereof to a smaller value, as a gross weight of the vehicle becomes larger.

* * * * *